(12) United States Patent
Kariya et al.

(10) Patent No.: US 10,337,094 B2
(45) Date of Patent: Jul. 2, 2019

(54) HOT-DIP GALVANIZED STEEL SHEET AND PRODUCTION METHOD THEREFOR

(75) Inventors: Nobusuke Kariya, Fukuyama (JP); Shinjiro Kaneko, Chiba (JP); Yasunobu Nagataki, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/131,957

(22) PCT Filed: Aug. 1, 2012

(86) PCT No.: PCT/JP2012/070130
§ 371 (c)(1),
(2), (4) Date: Apr. 21, 2014

(87) PCT Pub. No.: WO2013/022010
PCT Pub. Date: Feb. 14, 2013

(65) Prior Publication Data
US 2014/0220383 A1 Aug. 7, 2014

(30) Foreign Application Priority Data
Aug. 5, 2011 (JP) ................................. 2011-171520

(51) Int. Cl.
| | | |
|---|---|---|
| *B32B 15/01* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C21D 8/02* | (2006.01) | |
| *C23C 2/06* | (2006.01) | |
| *C23C 2/02* | (2006.01) | |
| *C22C 18/00* | (2006.01) | |
| *C22C 18/04* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/18* | (2006.01) | |

(52) U.S. Cl.
CPC .............. *C23C 2/02* (2013.01); *B32B 15/013* (2013.01); *C21D 8/0273* (2013.01); *C22C 18/00* (2013.01); *C22C 18/04* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C23C 2/06* (2013.01); *C21D 8/0226* (2013.01); *C21D 8/0236* (2013.01); *C21D 2211/002* (2013.01); *C21D 2211/005* (2013.01); *C21D 2211/009* (2013.01); *Y10T 428/12799* (2015.01)

(58) Field of Classification Search
USPC .................................................... 428/659
See application file for complete search history.

(56) References Cited

U.S. PATENT DOCUMENTS

| | | | | |
|---|---|---|---|---|
| 6,331,216 | B1* | 12/2001 | Toyooka ................. | C21D 8/10 148/320 |
| 8,784,578 | B2 | 7/2014 | Kawasaki | |
| 2003/0188811 | A1* | 10/2003 | Kami ................. | C21D 8/0226 148/603 |
| 2011/0036465 | A1* | 2/2011 | Kawasaki ............ | C21D 8/0205 148/533 |

FOREIGN PATENT DOCUMENTS

| | | | | |
|---|---|---|---|---|
| EP | 1291448 | * | 3/2003 | ............ C22C 38/00 |
| JP | 0344423 | | 2/1991 | |
| JP | 04-026744 | | 1/1992 | |
| JP | 05-43779 A | | 7/1993 | |
| JP | 05-43779 B2 | | 7/1993 | |
| JP | 06-108152 | | 4/1994 | |
| JP | 1060593 | | 3/1998 | |
| JP | H10-60593 | * | 3/1998 | |

(Continued)

OTHER PUBLICATIONS

English machine translation of JP 2007-107099, JPO, Accessed Feb. 4, 2015.*
GalvInfoNote 1.3, "Galvanneal—Differences from Galvanize", GalvInfo.com, pp. 1-8, accessed Apr. 18, 2015 at <http://galvinfo.com/ginotes/GalvInfoNote_1_3.pdf>.*
English Machine Translation of JPH10-60593, EPO, accessed Apr. 24, 2018.*
Kopeliovich, Dmitri, Iron-Carbon phase diagram, http://www.substech.com/dokuwiki/doku.php?id=iron-carbon_phase_diagram, accessed Apr. 24, 2018.*
International Search Report dated Nov. 13, 2012, application No. PCT/JP2012/070130.

(Continued)

*Primary Examiner* — Humera N Sheikh
*Assistant Examiner* — Xiaobei Wang
(74) *Attorney, Agent, or Firm* — RatnerPrestia

(57) ABSTRACT

Provided are a high-strength hot-dip galvanized steel sheet having excellent formability and a tensile strength of 440 MPa or more and a method for manufacturing the same. A steel sheet has a microstructure containing a ferrite phase having an area fraction of 60% or more, a pearlite phase having an area fraction of 20% to 30%, and a bainite phase having an area fraction of 1% to 5%, the area fraction of a cementite phase present in a grain of the ferrite phase being 5% or less. Upon manufacture, a hot-rolled sheet or a cold-rolled sheet is heated to a temperature of 650° C. or higher at an average heating rate of 10° C./s or more, is held at a temperature of 700° C. to $(Ac_{3-5})°$ C. for ten seconds or more, is cooled to a temperature of 300° C. to 500° C. at an average cooling rate of 10° C./s to 200° C./s, is held at a temperature of 300° C. to 500° C. for 30 seconds to 300 seconds, and is then hot-dip galvanized.

15 Claims, No Drawings

(56) References Cited

FOREIGN PATENT DOCUMENTS

| | | |
|---|---|---|
| JP | 10310847 | 11/1998 |
| JP | 2001152288 | 6/2001 |
| JP | 2003-193188 A | 7/2003 |
| JP | 2004315847 | 11/2004 |
| JP | 2004315848 | 11/2004 |
| JP | 2006265620 | 10/2006 |
| JP | 2007-107099 A | 4/2007 |
| JP | 2007-302992 * | 11/2007 |
| JP | 2008-106351 * | 5/2008 |
| JP | 2009-35815 A | 2/2009 |
| JP | 2010-255097 A | 11/2010 |
| KR | 1020020019124 | 3/2002 |
| WO | 2010098416 | 9/2010 |
| WO | 2011062000 | 5/2011 |

OTHER PUBLICATIONS

European Search Report dated May 4, 2015 for European Application No. 12822499.5.

Canadian Office Action for Canadian Application No. 2,844,202, dated Jan. 14, 2016.

Korean Office Action with partial English translation for Application No. 2014-7002890, dated Aug. 30, 2016, 12 pages.

European Communication for European Application No. 12 822 499.5, dated Jul. 30, 2018, 5 pages.

* cited by examiner

HOT-DIP GALVANIZED STEEL SHEET AND PRODUCTION METHOD THEREFOR

CROSS REFERENCE TO RELATED APPLICATIONS

This is the U.S. National Phase application of PCT/JP2012/070130, filed Aug. 1, 2012, which claims priority to Japanese Patent Application No. 2011-171520, filed Aug. 5, 2011, the disclosures of each of these applications being incorporated herein by reference in their entireties for all purposes.

TECHNICAL FIELD OF THE INVENTION

The present invention relates to a high-strength hot-dip galvanized steel sheet which is suitable for applications such as automotive parts and which has a tensile strength of 440 MPa or more and excellent formability and also relates to a method for manufacturing the same.

BACKGROUND OF THE INVENTION

In recent years, attempts have been made to reduce exhaust gases such as $CO_2$ from the viewpoint of global environmental protection. In the automotive industry, measures have been taken to reduce the amount of exhaust gas in such a way that fuel efficiency is increased by automotive weight reduction.

One of techniques for automotive weight reduction is that a steel sheet for use in automobiles is increased in strength and is thereby reduced in thickness. Steel sheets for use in floors need to have corrosion resistance in addition to increased strength and reduced thickness and therefore the application of high-strength hot-dip galvanized steel sheets is being investigated. Since steel sheets are reduced in ductility with an increase in strength, a steel sheet having both high strength and ductility is needed. Floor parts are formed so as to have a complicated shape in many cases and therefore ductility and stretch flangeability are needed.

In order to cope with such requirements, for example, Patent Literature 1 discloses a method for manufacturing a high-strength hot-dip galvanized steel sheet having low yield ratio, an excellent balance between strength and ductility, and excellent stretch flangeability. In the method, in a continuous galvanizing line, bainite transformation is caused in such a way that a steel sheet is cooled at a predetermined rate in a quenching zone after soaking and is maintained at a predetermined temperature and martensite transformation is caused in such a way that the steel sheet is galvanized, is alloyed, and is then quenched, whereby the microstructure of the steel sheet is transformed to a three-phase microstructure consisting of ferrite, bainite, and martensite.

Patent Literature 2 discloses a method for manufacturing a high-strength steel sheet with excellent formability. In this method, retained austenite is produced in the microstructure of the steel sheet in such a way that the average rate of cooling, subsequent to annealing and soaking, from 650° C. to a temperature at which a steel sheet enters a galvanizing bath or to a temperature of 450° C. is specified and the steel sheet is held at a temperature of 300° C. to 450° C. for a predetermined time before or after being galvanized, whereby the high-strength steel sheet is manufactured so as to have an excellent balance between strength and ductility.

Furthermore, Patent Literature 3 discloses a method for manufacturing a high-strength hot-dip galvanized steel sheet having a tensile strength equivalent to a 440-1,500 MPa class and excellent bendability ($\lambda$ value ($\lambda$: hole expansion ratio)) as evaluated by a hole expansion test in which a hole is expanded using a conical punch with an edge angle of 60° until cracks are formed around the hole. In this method, the content of each component is adjusted within an appropriate range, a reheating step is introduced after a galvanizing step, and further, cooling is performed at a predetermined cooling rate subsequently to a recrystallization annealing step and prior to the reheating step, whereby the microstructure of a steel sheet is transformed to tempered martensite.

PATENT LITERATURE

[PTL 1] Japanese Examined Patent Application Publication No. 5-43779

[PTL 2] Japanese Unexamined Patent Application Publication No. 4-26744

[PTL 3] Japanese Unexamined Patent Application Publication No. 6-108152

SUMMARY OF THE INVENTION

Since steel sheets are reduced in ductility with an increase in strength as described above, a steel sheet having both high strength and ductility is required. Floor parts are formed so as to have a complicated shape in many cases and therefore ductility and stretch flangeability are needed. While automotive high-strength steel sheets with a strength level of 590 MPa class or more in terms of tensile strength are under development, the strength level of steel sheets used as structural steel sheets for floors may be a 440 MPa class (a 440-490 MPa level). In order to ensure this strength level and in order to form a shape required for floor parts, a steel sheet having excellent ductility and stretch flangeability is needed.

However, although Patent Literature 1 discloses the method for manufacturing the high-strength hot-dip galvanized steel sheet having low yield ratio, an excellent balance between strength and ductility, and excellent stretch flangeability in such a way that the microstructure of the steel sheet is transformed to the three-phase microstructure consisting of ferrite, bainite, and martensite, none of the balance between a strength equivalent to a 440 MPa class and ductility and stretch flangeability is taken into account because martensite is introduced into the microstructure of the steel sheet and therefore the strength level thereof exceeds a 490 MPa class.

Although Patent Literature 2 discloses the method for manufacturing the high-strength steel sheet with an excellent balance between strength and ductility in such a way that retained austenite is produced in the microstructure of the steel sheet, there is a problem in that the stretch flangeability is low, whereas the ductility is excellent because of TRIP steel utilizing the transformation-induced plasticity of retained austenite.

Furthermore, although Patent Literature 3 discloses a method for achieving both high strength and hole expansibility in such a way that the microstructure of a steel sheet is transformed to tempered martensite, hole expansibility equivalent to a 440 MPa class is not taken into account because the tensile strength is 600 MPa or more.

The present invention has been made in view of the above circumstances and has an object to provide a hot-dip galvanized steel sheet which has high strength, that is, a tensile strength equivalent to a 440 MPa class (a 440-490 MPa level) and which also has excellent formability, particularly ductility and stretch flangeability, and a method for manufacturing the galvanized steel sheet.

The inventors have performed intensive investigations from the viewpoint of the composition and metallographic structure of a steel sheet. As a result, the inventors have found that it is extremely important that the content of each component of the composition is adjusted within an appropriate range and the metallographic structure is appropriately controlled. Further, the inventors have found that formability (both ductility and stretch flangeability) can be ensured with a tensile strength of 440 MPa or more by forming a metallographic structure containing a ferrite phase having an area fraction of 60% or more, a pearlite phase having an area fraction of 20% to 30%, and a bainite phase having an area fraction of 1% to 5%, the area fraction of a cementite phase present in a grain of the ferrite phase being 5% or less.

A metallographic structure for achieving high ductility is preferably a two-phase microstructure consisting of a ferrite phase and a martensite phase. However, the two-phase microstructure cannot achieve high stretch flangeability (hole expansibility) because the difference in hardness between the ferrite phase and the martensite phase is large.

In order to cope with the above, the inventors have been able to ensure both of ductility and stretch flangeability with a tensile strength of 440 MPa or more in the multiphase structure containing the ferrite phase, the pearlite phase, and the bainite phase by defining the composition and metallographic structure of the steel sheet as described above. That is, in the metallographic structure, ductility is ensured by assigning the ferrite phase as a primary phase; strength is ensured by introducing the bainite phase and the pearlite phase in the form of secondary phases; high ductility can be achieved while high stretch flangeability is ensured by appropriately controlling the area fraction of each of the ferrite phase, the bainite phase, and the pearlite phase and the area fraction of the cementite phase in a grain of the ferrite phase.

The present invention is based on the above findings and features thereof are as described below.

(1) A hot-dip galvanized steel sheet includes a steel sheet having a composition containing 0.100% to 0.200% C, 0.50% or less Si, 0.60% or less Mn, 0.100% or less P, 0.0100% or less S, 0.010% to 0.100% Al, and 0.0100% or less N on a mass basis, the remainder comprising Fe and inevitable impurities. The steel sheet has a microstructure containing a ferrite phase having an area fraction of 60% to 79%, a pearlite phase having an area fraction of 20% to 30%, and a bainite phase having an area fraction of 1% to 5%, the area fraction of a cementite phase present in a grain of the ferrite phase being 5% or less.

(2) In the hot-dip galvanized steel sheet specified in (1), the composition of the steel sheet further contains at least one selected from the group consisting of 0.05% to 0.80% Cr, 0.005% to 0.100% V, 0.005% to 0.500% Mo, 0.01% to 0.10% Cu, 0.01% to 0.10% Ni, and 0.0003% to 0.2000% B on a mass basis.

(3) In the hot-dip galvanized steel sheet specified in (1), the composition of the steel sheet further contains at least one selected from the group consisting of 0.001% to 0.005% Ca and 0.001% to 0.005% of an REM on a mass basis.

(4) In the hot-dip galvanized steel sheet specified in (1), the composition of the steel sheet further contains at least one selected from the group consisting of 0.05% to 0.80% Cr, 0.005% to 0.100% V, 0.005% to 0.500% Mo, 0.01% to 0.10% Cu, 0.01% to 0.10% Ni, and 0.0003% to 0.2000% B and at least one selected from the group consisting of 0.001% to 0.005% Ca and 0.001% to 0.005% of an REM on a mass basis.

(5) The hot-dip galvanized steel sheet specified in (1) is a hot-dip galvannealed steel sheet.

(6) The hot-dip galvanized steel sheet specified in (1) includes a galvanizing layer, wherein the galvanizing layer is a hot-dip galvannealing layer.

(7) In the hot-dip galvanized steel sheet specified in (6), the galvannealing layer has an Fe content of 7% to 15%.

(8) The hot-dip galvanized steel sheet specified in (1) has a tensile strength of 440 MPa or more.

(9) In the hot-dip galvanized steel sheet specified in (8), the tensile strength is 440 MPa to 490 MPa.

(10) The hot-dip galvanized steel sheet specified in (1) has a stretch flangeability of 77% or more.

(11) The hot-dip galvanized steel sheet specified in (1) has an elongation of 35% or more.

(12) In the hot-dip galvanized steel sheet specified in (1), the content of Si is 0.01% to 0.50%.

(13) In the hot-dip galvanized steel sheet specified in (1), the content of Mn is 0.10% to 0.60%.

(14) In the hot-dip galvanized steel sheet specified in (1), the content of P is 0.003% to 0.100%.

(15) A method for manufacturing a hot-dip galvanized steel sheet includes preparing a steel material having a composition containing 0.100% to 0.200% C, 0.50% or less Si, 0.60% or less Mn, 0.100% or less P, 0.0100% or less S, 0.010% to 0.100% Al, and 0.0100% or less N on a mass basis, the remainder comprising Fe and inevitable impurities; heating the steel material; hot-rolling the steel material at a finishing delivery temperature not lower than the $Ar_3$ temperature; coiling a hot-rolled sheet at a temperature of 600° C. or lower; pickling the hot-rolled sheet; performing heating to a temperature of 650° C. or higher at an average heating rate of 10° C./s or more; performing holding at a temperature of 700° C. to $(Ac_3-5)°$ C. for ten seconds or more; performing cooling to a temperature of 300° C. to 500° C. at an average cooling rate of 10° C./s to 200° C./s; performing holding at a temperature of 300° C. to 500° C. for 30 seconds to 300 seconds; and performing hot-dip galvanizing.

(16) The hot-dip galvanized steel sheet-manufacturing method specified in (15) further includes cold-rolling the pickled hot-rolled sheet.

(17) In the hot-dip galvanized steel sheet-manufacturing method specified in (16), the cold-rolling reduction is 40% to 85%.

(18) The hot-dip galvanized steel sheet-manufacturing method specified in (15) further includes performing alloying after galvanizing.

(19) In the hot-dip galvanized steel sheet-manufacturing method specified in (18), alloying is performed by heating a steel sheet to a temperature of 450° C. to 600° C.

In the present invention, "high strength" refers to a tensile strength TS of 440 MPa or more. In the present invention, a hot-dip galvanized steel sheet particularly having excellent formability with a tensile strength of 440 MPa to 490 MPa can be provided. A high-strength hot-dip galvanized steel sheet according to the present invention comprises either a cold-rolled steel sheet or hot-rolled steel sheet serving as a base steel sheet for galvanizing and also includes either a plated steel sheet (hereinafter referred to as GI in some cases) which is not alloyed after hot-dip galvanizing or a plated steel sheet (hereinafter referred to as GA in some cases) which is alloyed after hot-dip galvanizing.

According to the present invention, a high-strength hot-dip galvanized steel sheet having a tensile strength of 440 MPa or more and excellent formability can be obtained. In the present invention, the following steel sheet can be obtained: a high-strength hot-dip galvanized steel sheet in which the content of an alloy component such as Mn is reduced, which is reduced in alloy cost, which is inexpensive, and which has improved ductility and stretch flangeability.

A high-strength hot-dip galvanized steel sheet according to the present invention has excellent ductility and stretch flangeability, therefore can improve fuel efficiency by automotive weight reduction when being used in, for example, structural parts of automobiles, and is extremely high in industrial usefulness.

DESCRIPTION OF EMBODIMENTS OF THE INVENTION

The present invention is described below in detail by reference to exemplary embodiments. In descriptions below, the term "composition and microstructure of steel or a steel sheet" refers to the composition and microstructure of only steel or a steel sheet that is a portion of a hot-dip galvanized steel sheet, the portion excluding a coating layer. The unit of the content of each element in the steel composition is "percent by mass" and the content thereof is simply denoted by "%" unless otherwise specified.

First, the composition of a steel sheet that is the most advantageous for the present invention is described.

C: 0.100% to 0.200%

C is an element which is essential to ensure desired strength and which is essential to form multi-phase microstructure in order to increase the strength and the ductility, and therefore is preferably 0.100% or more. However, addition exceeding 0.200% causes a significant increase in strength and therefore desired formability is not achieved. Thus, C preferably ranges from 0.100% to 0.200%.

Si: 0.50% or less

Si is an element which produces a ferrite phase and which is effective in hardening steel. However, when the content thereof is more than 0.50%, the strength is significantly increased and therefore desired formability is not achieved. Thus, Si is preferably 0.50% or less. In addition, the case of 0.01% or more is effective in strengthening steel; hence, 0.01% or more is preferred.

Mn: 0.60% or less

Mn, as well as C, is an element essential to ensure desired strength, stabilizes an austenite phase, and promotes the production of a secondary phase such as a bainite phase. However, excessive addition exceeding 0.60% causes the area fraction of the secondary phase microstructure to be excessive to reduce the ductility. Therefore, Mn is preferably 0.60% or less. In addition, the case of 0.10% or more is effective in strengthening steel; hence, 0.10% or more is preferred.

P: 0.100% or less

P is an element effective in strengthening steel. When the content thereof is more than 0.100%, embrittlement is caused by intergranular segregation and impact resistance is deteriorated. Thus, P is preferably 0.100% or less. In addition, the case of 0.003% or more is effective in strengthening steel; hence, 0.003% or more is preferred.

S: 0.0100% or less

S forms a non-metallic inclusion such as MnS to reduce the hole expansibility because the edge of a hole is likely to be cracked during punching in a hole expansion test. S is preferably minimized. S is preferably 0.0100% or less. From the viewpoint of manufacturing costs also, S is preferably 0.0100% or less. S is more preferably 0.0070% or less.

Al: 0.010% to 0.100%

For the deoxidation of steel, 0.010% or more Al is added. However, when exceeding 0.100%, the surface appearance after plating is significantly deteriorated. Therefore, Al preferably ranges from 0.010% to 0.100%.

N: 0.0100% or less

When the content of N is 0.0100% or less as in usual steel, N does not impair effects of the present invention. Thus, N is preferably 0.0100% or less.

Remainder containing Fe and inevitable impurities

The above components form a basic composition. In the present invention, at least one selected from the group consisting of Cr, V, Mo, Cu, Ni, and B may be contained in addition to the above basic composition.

Containing at least one selected from the group consisting of 0.05% to 0.80% Cr, 0.005% to 0.100% V, 0.005% to 0.500% Mo, 0.01% to 0.10% Cu, 0.01% to 0.10% Ni, and 0.0003% to 0.2000% B Cr and V may be added for the purpose of increasing the hardenability of steel to increase the strength thereof. Mo is an element effective in increasing the hardenability of steel and may be added for the purpose of increasing the strength thereof. Cu and Ni are elements contributing to strength and may be added for the purpose of strengthening steel. B has the action of suppressing the production of ferrite from austenite grain boundaries and therefore may be added as required. The lower limit of each element is the minimum sufficient to achieve a desired effect and the upper limit is an amount causing an effect to be saturated. Therefore, when being added, it is preferred that Cr is 0.05% to 0.80%, V is 0.005% to 0.100%, Mo is 0.005% to 0.500%, Cu is 0.01% to 0.10%, Ni is 0.01% to 0.10%, and B is 0.0003% to 0.2000%.

Containing at least one selected from the group consisting of 0.001% to 0.005% Ca and 0.001% to 0.005% REM Ca and an REM may be added for the purpose of spheroidizing sulfides to improve the stretch flangeability. The lower limit of each element is the minimum sufficient to achieve a desired effect and the upper limit is an amount causing an effect to be saturated. Therefore, when being added, it is preferred that Ca is 0.001% to 0.005% and the REM is 0.001% to 0.005%.

Next, reasons for limiting the microstructure of a hot-dip galvanized steel sheet according to embodiments of the present invention are described.

Area fraction of ferrite phase: 60% to 79% In order to ensure high ductility, the area fraction of the ferrite phase is preferably 60% or more and more preferably 65% or more. In order to ensure the minimum amount of each of a pearlite phase, bainite phase, and cementite phase below, the area fraction of the ferrite phase is preferably 79% or less.

Area fraction of pearlite phase: 20% to 30%

In order to ensure strength and in order to achieve high stretch flangeability, the area fraction of the pearlite phase is preferably 20% or more. However, in order to achieve desired formability without causing an excessive increase in strength, the area fraction of the pearlite phase is preferably 30% or less.

Area fraction of bainite phase: 1% to 5%

In order to ensure desired strength, the area fraction of the bainite phase is preferably 1% or more. However, in order to achieve desired formability without causing an excessive increase in strength, the area fraction of the bainite phase is preferably 5% or less.

Area fraction of cementite phase present in grain of ferrite phase: 5% or less

In order to achieve good stretch flangeability, the area fraction of the cementite phase present in a grain of the ferrite phase is preferably 5% or less.

The microstructure may contain a retained austenite phase in addition to the ferrite phase, the pearlite phase, the bainite phase, and the cementite phase present in the grain of the ferrite phase. In this case, the area fraction of the retained austenite phase is preferably 1% or less from the viewpoint of ensuring good stretch flangeability.

For a metallographic structure, the area fraction of each phase can be determined as follows: a ¼ position of a thicknesswise cross section parallel to the rolling direction of the steel sheet is polished, subsequently etched with 3% nital, and then observed over ten fields of view with a scanning electron microscope (SEM) at a magnification of 2,000×, and images thereof are analyzed by image analysis using image analysis software "Image Pro Plus ver. 4.0" developed by Media Cybernetics. In this case, the ferrite phase, the pearlite phase, the bainite phase, and the cementite phase present in the grain of the ferrite phase are distinguished on a digital image by image analysis, the image is processed, and the area fraction of each phase is determined for the measured fields of view. The measurements (for example, ten fields of view) may be averaged into the area fraction of the phase. A method for determining the area fraction is not limited to this method. A conventional method including conventional visual observation may be used to determine the area fraction.

Next, a method for manufacturing the hot-dip galvanized steel sheet according to an embodiment of the present invention is described.

Molten steel having the above described composition is produced by a steelmaking process using a converter or the like and may be cast into a steel material (slab) by a casting process such as a continuous casting process.

Subsequently, hot rolling is performed in such a way that the obtained steel material is heated and is rolled into a hot-rolled sheet. In this operation, it is preferred for hot rolling that the finishing delivery temperature is the $Ar_3$ temperature or higher and the hot-rolled sheet is coiled at a temperature of 600° C. or lower.

Finishing delivery temperature: $Ar_3$ temperature or higher

When the finishing delivery temperature is lower than the $Ar_3$ temperature, the ferrite phase is produced in a surface layer of the steel sheet and the microstructure becomes nonuniform in the thickness direction because of the coarsening of the ferrite phase by work strain; hence, the area fraction of the ferrite phase in the microstructure subjected to cold rolling and continuous galvanizing cannot be controlled to 60% or more. Thus, the finishing delivery temperature is preferably the $Ar_3$ temperature or higher. For the $Ar_3$ temperature, an actually measured temperature may be used, although the $Ar_3$ temperature can be calculated from the following equation:

$$Ar_3 = 910 - 310 \times [C] - 80 \times [Mn] + 0.35 \times (t - 0.8) \quad (1)$$

where [M] represents the content (mass percent) of an element M and t represents the thickness (mm) of the steel sheet. A correction term may be introduced into (1) depending on a contained element. When, for example, Cu, Cr, Ni, or Mo is contained, a correction term such as $-20 \times [Cu]$, $-15 \times [Cr]$, $-55 \times [Ni]$, or $-80 \times [Mo]$, respectively, may be introduced in the right-hand side of Equation (1).

Coiling temperature: 600° C. or lower

When the coiling temperature is higher than 600° C., the area fraction of the pearlite phase is increased. Therefore, the steel sheet subjected to continuous galvanizing has a microstructure in which the area fraction of the pearlite phase is more than 30%. This causes an excessive increase in strength. Thus, the coiling temperature is preferably 600° C. or lower. The coiling temperature is more preferably 200° C. or higher because otherwise the shape of the hot-rolled sheet is deteriorated.

Subsequently, the steel sheet is pickled and may be then cold-rolled as required.

In a pickling step, black scales produced on a surface are removed. Pickling conditions are not particularly limited.

Cold-rolling reduction: 40% or more (preferred condition)

In order to adjust the thickness of the steel sheet to an appropriate value, the pickled steel sheet may be cold-rolled as required. When the cold-rolling reduction is 40% or more, there are effects that the recrystallization of the ferrite phase is promoted, an unrecrystallized ferrite phase is prevented from remaining in the microstructure subjected to continuous galvanizing, and the ductility and the stretch flangeability are further improved. Therefore, the cold-rolling reduction is preferably 40% or more. On the other hand, when the cold-rolling reduction is 85% or less, the steel sheet subjected to continuous galvanizing has a desired metallographic structure. Therefore, the cold-rolling reduction is preferably 85% or less.

Subsequently, continuous galvanizing is performed. In this operation, it is preferred that the steel sheet is heated to a temperature of 650° C. to 700° C. at an average heating rate of 10° C./s to 30° C./s, is held at a temperature of 700° C. to $(Ac_3-5)°$ C. for ten seconds to 600 seconds, is cooled to a temperature of 300° C. to 500° C. at an average cooling rate of 10° C./s to 200° C./s, is held at a temperature of 300° C. to 500° C. for 30 seconds to 300 seconds, and is then subjected to galvanizing.

Heating to temperature of 650° C. to 700° C. at average heating rate of 10° C./s to 30° C./s The heating temperature is preferably 650° C. or higher, because the recrystallization of the ferrite phase is promoted, the area fraction of the ferrite phase in the steel sheet subjected to continuous galvanizing is 60% or more, and the ductility is increased. When the average heating rate is 10° C./s to 30° C./s, any long furnace or a large amount of energy consumption is not necessary and the manufacturing efficiency can be increased at low cost.

Holding at temperature of 700° C. to $(Ac_3-5)°$ C. for ten seconds or more

When the annealing (holding) temperature is 700° C. or higher and the annealing (holding) time is ten seconds or more, cementite is sufficiently dissolved during annealing, the austenite phase can be sufficiently produced, sufficient amounts of secondary phases (the pearlite phase and the bainite phase) are ensured during cooling in annealing, and sufficient strength can be achieved. Furthermore, the area fraction of the cementite phase present in a grain of the ferrite phase is suppressed to 5% or less and good stretch flangeability can be achieved. When the annealing (holding) temperature is $(Ac_3-5)°$ C. or lower, the growth of grains of the austenite phase is suppressed, the area fraction of the ferrite phase in the steel sheet subjected to continuous galvanizing can be ensured at 60% or more, and good ductility can be achieved. The upper limit of the annealing (holding) time is not particularly limited. The annealing (holding) time is preferably 600 seconds or less because a sufficient effect can be achieved by holding for 600 seconds or less and an increase in cost is not caused.

Although the $Ac_3$ temperature can be calculated from the following Equation (2), an actually measured temperature may be used:

$$Ac_3=910-203\times\sqrt{[C]}-15.2\times[Ni]+44.7\times[Si]+104\times[V]+31.5\times[Mo]+13.1\times[W]-30\times[Mn]-11\times[Cr]-20\times[Cu]+700\times[P]+400\times[Al]+120\times[As]+400\times[Ti] \quad (2)$$

where [M] represents the content (mass percent) of an element M and $\sqrt{[C]}$ represents the square root of the content (mass percent) of C.

Cooling to temperature of 300° C. to 500° C. at average cooling rate of 10° C./s to 200° C./s The average cooling rate is one of important requirements for the present invention. The area fraction of the cementite phase present in a grain of the ferrite phase can be controlled and the area fraction of the pearlite phase and that of the bainite phase can be controlled by rapid cooling to a temperature of 300° C. to 500° C. at a predetermined average cooling rate. When the average cooling rate is 10° C./s or more, the area fraction of the cementite phase present in the grain of the ferrite phase can be suppressed to 5% or less and good stretch flangeability can be achieved. When the average cooling rate is 200° C./s or less, the ferrite phase is sufficiently precipitated and appropriate strength and good ductility can be achieved without excessively precipitating the pearlite phase or the bainite phase. In order to allow the steel sheet to have a good shape, the average cooling rate is preferably 200° C./s or less.

Holding at temperature of 300° C. to 500° C. for 30 seconds to 300 seconds

Holding at a temperature is one of important requirements for the present invention. When the holding temperature is 300° C. to 500° C. and the holding time is 30 seconds or more, bainite transformation is promoted, the steel sheet subjected to continuous galvanizing has a microstructure in which the area fraction of the bainite phase is 1% or more, and therefore necessary strength can be ensured. When the holding temperature is higher than 500° C., bainite transformation is slow. Then the steel sheet subjected to continuous galvanizing does not have any microstructure in which the area fraction of the bainite phase is 1% or more, and it is difficult to ensure strength. Also then the area fraction of the cementite phase present in the grain of the ferrite phase exceeds 5%, and the stretch flangeability is reduced. When the holding time is more than 300 seconds, the strength is increased and the ductility is deteriorated because the bainite phase is excessively precipitated. Further, in this case, the area fraction of the cementite phase present in the grain of the ferrite phase exceeds 5% and the stretch flangeability is reduced. On the other hand, in the case of holding at the above temperature for 30 seconds to 300 seconds, sufficient strength is achieved and good ductility and stretch flangeability can be achieved.

Subsequently, hot-dip galvanizing is performed. Further, a galvanizing layer is alloyed as required. Then cooling to room temperature is performed.

In the case of performing alloying subsequently to galvanizing, it is preferred that after galvanizing is performed, the galvanizing layer is alloyed by heating the steel sheet to, for example, a temperature of 450° C. to 600° C. such that the galvanizing layer has an Fe content of 7% to 15%. In a range of 7% or more, the occurrence of uneven alloying can be prevented and flaking properties can be improved. In a range of 15% or less, the exfoliation resistance is increased. Therefore, the galvanizing layer preferably has an Fe content of 7% to 15%.

As described above, the hot-dip galvanized steel sheet according to the present invention is obtained so as to have excellent formability and high strength, that is, a tensile strength preferably of 440 MPa or more.

In addition, in heat treatment in the manufacturing method according to the present invention, the holding temperature need not be constant within the above temperature range. Further, even if the cooling rate is varied during cooling, there is no problem as long as the cooling rate is within a specified range. Even if any facility is used to perform heat treatment, the spirit of the present invention is not impaired as long as desired thermal history is satisfied in the heat treatment. In addition further, the scope of the present invention includes performing temper rolling for the purpose of correcting a shape. The scope of the present invention includes the case of manufacturing the steel material in such a way that a hot rolling step is partly or entirely omitted by, for example, casting a thin slab, whereas the present invention assumes that the steel material is manufactured through usual steps such as steelmaking, casting, and hot rolling. Furthermore, even if the obtained high-strength hot-dip galvanized steel sheet according to the present invention is subjected to various surface treatments such as chemical conversion, effects of the present invention are not impaired.

EXAMPLES

The present invention is described below in detail on the basis of examples.

Steel materials (slabs) having compositions shown in Table 1 were used as starting materials. After being heated to heating temperatures shown in Tables 2 and 3, the steel materials were hot-rolled under conditions shown in Tables 2 and 3, were pickled, were subsequently cold-rolled, and were then subjected to continuous galvanizing. Sheet thicknesses before cold rolling are different depending on Steel Sheet No. One (Steel Sheet No. 5) of steel sheets was not cold-rolled. Subsequently, the steel sheets were alloyed after continuous galvanizing except some thereof.

In a continuous galvanizing line, for GA, a Zn bath containing 0.14% by mass Al was used, and for GI, a Zn bath containing 0.18% by mass Al was used. Coating weight was adjusted by gas wiping and alloying was performed for GA.

Galvanized steel sheets (GA and GI) obtained as described above were evaluated for metallographic observation, tensile properties, and stretch flangeability (hole expansion test). Measurement methods are described below.

(1) Metallographic Observation

The area fraction of each phase was determined as follows: a ¼-depth position of a thicknesswise cross section parallel to the rolling direction of a steel sheet was polished, subsequently etched with 3% nital, and then observed over ten fields of view with a scanning electron microscope (SEM) at a magnification of 2,000×, and images thereof were analyzed by image analysis using image analysis software "Image Pro Plus ver. 4.0" developed by Media Cybernetics. That is, a ferrite phase, a pearlite phase, a bainite phase, and a cementite phase present in a grain of the ferrite phase were distinguished on a digital image by image analysis, the image was processed, and the area fraction of each phase was determined for the measured fields of view. The measurements (ten fields of view) were averaged into the area fraction of the phase.

(2) Tensile Properties

A JIS No. 5 tensile specimen was taken from each obtained steel sheet in the rolling direction of the steel sheet and was subjected to a tensile test (JIS Z 2241 (2011)). The tensile test was continued until fracture occurred, whereby the tensile strength and the elongation (ductility) were determined. A steel sheet having an elongation of 35.0% or more in terms of tensile properties was evaluated to be excellent in ductility.

(3) Stretch Flangeability

The stretch flangeability was determined in accordance with the Japan Iron and Steel Federation standard (JFS) T 1001 (1996). Each obtained steel sheet was cut into a piece with a size of 100 mm×100 mm, a hole with a diameter ($d_0$) of 10 mm was bored therein at a clearance of 12% by punching, a 60-degree conical punch was pushed into the hole in such a state that the piece was fixed with a fold pressure of nine tons using a dice with an inside diameter of 75 mm, the diameter $d_b$ of the hole was measured at the point of time when a thicknesswise penetration crack was formed in the edge of the hole, and the critical hole expansion ratio λ (%) defined by an equation below was determined. The stretch flangeability was evaluated from the critical hole expansion ratio. A steel sheet having a stretch flangeability of 77% or more was evaluated to be particularly excellent in stretch flangeability.

$$\lambda = 100 \times (d_b - d_0)/d_0 \qquad (3)$$

Results obtained as described above and conditions are summarized in Tables 2 and 3.

TABLE 1

(mass percent)

| Steel No. | C | Si | Mn | P | S | Al | N | Cr | V | Mo | Cu | Ni | B | Ca | REM | Ar₃ (° C.) | Ac₃ (° C.) | Remarks |
|---|---|---|---|---|---|---|---|---|---|---|---|---|---|---|---|---|---|---|
| A | 0.140 | 0.11 | 0.34 | 0.015 | 0.0037 | 0.032 | 0.0053 | — | — | — | — | — | — | — | — | 840 | 852 | Example of present invention |
| B | 0.116 | 0.13 | 0.57 | 0.010 | 0.0030 | 0.034 | 0.0041 | — | — | — | — | — | — | — | — | 829 | 850 | Example of present invention |
| C | 0.132 | 0.46 | 0.31 | 0.019 | 0.0039 | 0.029 | 0.0037 | — | — | — | — | — | — | — | — | 844 | 872 | Example of present invention |
| D | 0.193 | 0.30 | 0.12 | 0.024 | 0.0048 | 0.026 | 0.0046 | — | — | — | — | — | — | — | — | 841 | 858 | Example of present invention |
| E | 0.167 | 0.02 | 0.25 | 0.004 | 0.0035 | 0.043 | 0.0035 | — | — | — | — | — | — | — | — | 839 | 840 | Example of present invention |
| F | 0.154 | 0.05 | 0.43 | 0.013 | 0.0021 | 0.038 | 0.0027 | 0.07 | — | — | — | — | — | — | — | 827 | 843 | Example of present invention |
| G | 0.165 | 0.37 | 0.30 | 0.011 | 0.0029 | 0.036 | 0.0028 | — | 0.06 | — | — | — | — | — | — | 835 | 863 | Example of present invention |
| H | 0.137 | 0.28 | 0.44 | 0.018 | 0.0024 | 0.015 | 0.0032 | — | — | 0.04 | — | — | — | — | — | 829 | 854 | Example of present invention |
| I | 0.180 | 0.08 | 0.42 | 0.007 | 0.0028 | 0.037 | 0.0044 | — | — | — | — | — | 0.0013 | — | — | 821 | 835 | Example of present invention |
| J | 0.119 | 0.16 | 0.58 | 0.015 | 0.0026 | 0.040 | 0.0049 | — | — | — | 0.03 | 0.04 | — | — | — | 824 | 855 | Example of present invention |
| K | 0.148 | 0.24 | 0.49 | 0.023 | 0.0033 | 0.034 | 0.0030 | — | — | — | — | — | — | 0.003 | — | 825 | 858 | Example of present invention |
| L | 0.156 | 0.19 | 0.53 | 0.014 | 0.0025 | 0.039 | 0.0033 | — | — | — | — | — | — | — | 0.002 | 819 | 848 | Example of present invention |
| M | 0.121 | 0.13 | 0.36 | 0.011 | 0.0024 | 0.045 | 0.0027 | — | — | — | — | — | — | — | — | 844 | 860 | Example of present invention |
| a | <u>0.052</u> | 0.47 | 0.34 | 0.020 | 0.0024 | 0.035 | 0.0038 | — | — | — | — | — | — | — | — | 867 | 903 | Comparative example |
| b | <u>0.254</u> | 0.18 | 0.47 | 0.033 | 0.0016 | 0.040 | 0.0032 | — | — | — | — | — | — | — | — | 794 | 841 | Comparative example |
| c | 0.136 | 0.10 | <u>0.85</u> | 0.010 | 0.0027 | 0.026 | 0.0021 | — | — | — | — | — | — | — | — | 800 | 832 | Comparative example |
| d | 0.154 | <u>1.02</u> | 0.41 | 0.025 | 0.0035 | 0.042 | 0.0019 | — | — | — | — | — | — | — | — | 830 | 898 | Comparative example |

Underlined values are outside the scope of the present invention.

TABLE 2

| Steel sheet No. | Steel No. | Hot rolling conditions | | | Cold-rolling conditions | | Continuous galvanizing conditions | | | | | |
|---|---|---|---|---|---|---|---|---|---|---|---|---|
| | | Heating temperature (° C.) | Finishing delivery temperature (° C.) | Coiling temperature (° C.) | Cold-rolling reduction (%) | Thickness (mm) | Average heating rate to temperature of 650° C. or higher (° C./s) | Heating temperature (° C.) | Holding temperature (° C.) | Holding time (s) | Average cooling rate to temperature of 300° C. to 500° C. (° C./s) | Holding temperature (° C.) |
| 1 | A | 1200 | 850 | 560 | 59 | 1.4 | 12 | 750 | 820 | 180 | 15 | 400 |
| 2 | B | 1200 | 850 | 560 | 61 | 1.4 | 13 | 750 | 820 | 190 | 30 | 350 |
| 3 | C | 1220 | 850 | 560 | 63 | 1.4 | 13 | 780 | 840 | 190 | 30 | 340 |
| 4 | D | 1220 | 850 | 560 | 63 | 1.4 | 11 | 780 | 840 | 150 | 55 | 330 |
| 5 | E | 1200 | 850 | 560 | — | 2.3 | 10 | 680 | 800 | 170 | 55 | 360 |
| 6 | F | 1200 | 850 | 560 | 56 | 1.4 | 11 | 740 | 800 | 170 | 40 | 380 |
| 7 | G | 1200 | 850 | 560 | 61 | 1.4 | 12 | 740 | 840 | 180 | 35 | 410 |
| 8 | H | 1200 | 850 | 560 | 59 | 1.4 | 12 | 730 | 840 | 200 | 100 | 350 |
| 9 | I | 1200 | 850 | 550 | 63 | 1.4 | 13 | 760 | 810 | 220 | 120 | 340 |
| 10 | J | 1210 | 850 | 550 | 61 | 1.4 | 13 | 760 | 830 | 180 | 140 | 330 |
| 11 | K | 1210 | 850 | 550 | 56 | 1.4 | 12 | 760 | 830 | 200 | 25 | 390 |
| 12 | L | 1200 | 850 | 550 | 56 | 1.4 | 12 | 760 | 830 | 200 | 20 | 370 |
| 13 | M | 1200 | 850 | 560 | 61 | 1.4 | 15 | 750 | 830 | 200 | 35 | 380 |
| 14 | a | 1200 | 870 | 560 | 56 | 1.4 | 12 | 750 | 850 | 190 | 30 | 500 |
| 15 | b | 1200 | 850 | 560 | 61 | 1.4 | 12 | 740 | 790 | 200 | 40 | 500 |
| 16 | c | 1200 | 850 | 560 | 59 | 1.4 | 12 | 740 | 780 | 200 | 40 | 450 |
| 17 | d | 1200 | 850 | 560 | 59 | 1.4 | 12 | 750 | 850 | 200 | 40 | 420 |

TABLE 2-continued

| Steel sheet No. | Continuous galvanizing conditions | | Microstructure | | | | | Properties | | | Remarks |
|---|---|---|---|---|---|---|---|---|---|---|---|
| | Holding time (s) | Alloying | Area fraction of ferrite (%) | Area fraction of pearlite (%) | Area fraction of bainite (%) | Area fraction of cementite present in ferrite grain (%) | Other microstructures | Tensile strength (MPa) | Ductility (elongation) (%) | Stretch flangeability (%) | |
| 1 | 120 | Performed | 66 | 28 | 2 | 4 | — | 451 | 37.5 | 84.6 | Example of present invention |
| 2 | 100 | Performed | 75 | 21 | 1 | 3 | — | 454 | 37.3 | 79.1 | Example of present invention |
| 3 | 80 | Performed | 67 | 27 | 4 | 2 | — | 471 | 36.1 | 79.6 | Example of present invention |
| 4 | 80 | Performed | 70 | 24 | 4 | 2 | — | 470 | 36.3 | 78.4 | Example of present invention |
| 5 | 70 | Performed | 73 | 22 | 2 | 3 | — | 444 | 38.2 | 82.5 | Example of present invention |
| 6 | 80 | Performed | 64 | 29 | 3 | 4 | — | 454 | 36.6 | 86.2 | Example of present invention |
| 7 | 80 | Performed | 68 | 24 | 5 | 3 | — | 480 | 35.1 | 81.8 | Example of present invention |
| 8 | 90 | Performed | 64 | 28 | 4 | 4 | — | 468 | 35.4 | 79.5 | Example of present invention |
| 9 | 90 | Performed | 65 | 29 | 4 | 2 | — | 467 | 35.6 | 79.3 | Example of present invention |
| 10 | 110 | Performed | 72 | 21 | 3 | 3 | Retained austenite | 469 | 36.4 | 77.6 | Example of present invention |
| 11 | 110 | Performed | 64 | 28 | 4 | 4 | — | 472 | 35.3 | 85.9 | Example of present invention |
| 12 | 100 | Performed | 62 | 29 | 4 | 5 | — | 473 | 35.0 | 84.1 | Example of present invention |
| 13 | 100 | Performed | 65 | 30 | 2 | 3 | — | 467 | 35.4 | 85.4 | Example of present invention |
| 14 | 150 | Performed | 86 | 9 | 0 | 5 | — | 425 | 32.5 | 65.3 | Comparative example |
| 15 | 120 | Performed | 54 | 32 | 5 | 9 | — | 510 | 30.2 | 51.2 | Comparative example |
| 16 | 60 | Performed | 66 | 22 | 4 | 8 | — | 480 | 30.0 | 55.8 | Comparative example |
| 17 | 50 | Performed | 67 | 11 | 6 | 15 | Retained austenite | 534 | 28.8 | 50.4 | Comparative example |

Underlined values are outside the scope of the present invention.

TABLE 3

| Steel sheet No. | Steel No. | Hot-rolling conditions | | | Cold-rolling conditions | | Continuous galvanizing conditions | | | | |
|---|---|---|---|---|---|---|---|---|---|---|---|
| | | Heating temperature (° C.) | Finishing delivery temperature (° C.) | Coiling temperature (° C.) | Cold-rolling reduction (%) | Thickness (mm) | Average heating rate to temperature of 650° C. or higher (° C./s) | Heating temperature (° C.) | Holding temperature (° C.) | Holding time (s) | Average cooling rate to temperature of 300° C. to 500° C. (° C./s) | Holding temperature (° C.) |
| 18 | C | 1220 | <u>715</u> | 570 | 59 | 1.4 | 13 | 790 | 830 | 200 | 45 | 330 |
| 19 | C | 1220 | 850 | <u>690</u> | 56 | 1.4 | 12 | 780 | 820 | 190 | 50 | 420 |
| 20 | C | 1220 | 850 | 550 | 56 | 1.4 | <u>3</u> | <u>510</u> | 800 | 210 | 35 | 400 |
| 21 | C | 1250 | 850 | 590 | 56 | 1.4 | 11 | 770 | 790 | 180 | 30 | 450 |
| 22 | C | 1250 | 850 | 540 | 56 | 1.4 | 13 | 780 | 810 | 190 | 35 | 420 |
| 23 | C | 1220 | 850 | 560 | 56 | 1.4 | 12 | 670 | <u>680</u> | 160 | 20 | 380 |
| 24 | C | 1220 | 850 | 550 | 56 | 1.4 | 12 | 790 | <u>970</u> | 170 | 20 | 370 |
| 25 | C | 1220 | 850 | 540 | 59 | 1.4 | 13 | 750 | 840 | 190 | 20 | 390 |
| 26 | C | 1220 | 850 | 540 | 61 | 1.4 | 13 | 740 | 830 | 180 | 45 | 390 |
| 27 | C | 1220 | 850 | 560 | 56 | 1.4 | 14 | 790 | 810 | <u>5</u> | 25 | 360 |
| 28 | C | 1220 | 850 | 570 | 63 | 1.4 | 12 | 780 | 830 | 200 | 40 | 440 |
| 29 | C | 1220 | 850 | 510 | 61 | 1.4 | 15 | 770 | 790 | 190 | 15 | 475 |
| 30 | C | 1220 | 850 | 550 | 56 | 1.4 | 13 | 750 | 770 | 210 | <u>4</u> | 410 |
| 31 | F | 1220 | 840 | 580 | 61 | 1.4 | 15 | 780 | 810 | 150 | <u>230</u> | 390 |
| 32 | F | 1220 | 840 | 560 | 59 | 1.4 | 13 | 760 | 800 | 240 | 20 | 340 |
| 33 | F | 1220 | 840 | 540 | 59 | 1.4 | 12 | 770 | 820 | 180 | 40 | 490 |
| 34 | F | 1220 | 840 | 530 | 56 | 1.4 | 11 | 750 | 780 | 200 | 55 | <u>260</u> |
| 35 | F | 1220 | 840 | 570 | 59 | 1.4 | 15 | 780 | 820 | 180 | 25 | <u>610</u> |
| 36 | F | 1220 | 840 | 570 | 56 | 1.4 | 13 | 760 | 800 | 190 | 45 | 310 |
| 37 | F | 1220 | 840 | 570 | 59 | 1.4 | 12 | 770 | 790 | 190 | 80 | 350 |
| 38 | M | 1220 | 860 | 550 | 63 | 1.4 | 13 | 790 | 820 | 200 | 15 | 490 |
| 39 | M | 1220 | 860 | 550 | 61 | 1.4 | 14 | 760 | 780 | 160 | 60 | 410 |
| 40 | a | 1220 | 870 | 550 | 61 | 1.4 | 14 | <u>680</u> | <u>690</u> | 190 | <u>6</u> | 330 |
| 41 | a | 1220 | 870 | 550 | 56 | 1.4 | 13 | 780 | 840 | 160 | 75 | 390 |
| | | | | | | | | | | | 100 | <u>620</u> |

TABLE 3-continued

| | Continuous galvanizing conditions | | Microstructure | | | | | Properties | | | |
|---|---|---|---|---|---|---|---|---|---|---|---|
| Steel sheet No. | Holding time (s) | Alloying | Area fraction of ferrite (%) | Area fraction of pearlite (%) | Area fraction of bainite (%) | Area fraction of cementite present in ferrite grain (%) | Other microstructures | Tensile strength (MPa) | Ductility (elongation) (%) | Stretch flangeability (%) | Remarks |
| 18 | 130 | Performed | <u>59</u> | 26 | 4 | <u>11</u> | — | 506 | 31.5 | 52.4 | Comparative example |
| 19 | 150 | Performed | <u>53</u> | 33 | 1 | <u>13</u> | — | 523 | 30.3 | 48.7 | Comparative example |
| 20 | 180 | Performed | 62 | <u>22</u> | 4 | <u>12</u> | — | 515 | 29.2 | 49.5 | Comparative example |
| 21 | 160 | Performed | 63 | 28 | 4 | 5 | — | 464 | 35.6 | 79.4 | Example of present invention |
| 22 | 150 | Performed | 64 | 27 | 5 | 4 | — | 461 | 36.1 | 82.6 | Example of present invention |
| 23 | 200 | Performed | 79 | <u>10</u> | <u>0</u> | <u>11</u> | — | 417 | 33.9 | 55.2 | Comparative example |
| 24 | 140 | Performed | <u>59</u> | <u>26</u> | 2 | <u>13</u> | — | 482 | 32.4 | 56.1 | Comparative example |
| 25 | 190 | Performed | 67 | 24 | 5 | 4 | — | 479 | 35.3 | 85.3 | Example of present invention |
| 26 | 160 | Performed | 67 | 26 | 4 | 3 | — | 458 | 36.7 | 81.8 | Example of present invention |
| 27 | 210 | Performed | 77 | <u>12</u> | 2 | <u>9</u> | — | 473 | 32.5 | 56.6 | Comparative example |
| 28 | 170 | Performed | 76 | <u>21</u> | 2 | <u>1</u> | — | 442 | 40.6 | 78.4 | Example of present invention |
| 29 | 140 | Performed | 61 | 21 | 3 | <u>15</u> | — | 465 | 33.1 | 59.4 | Comparative example |
| 30 | 130 | Performed | <u>51</u> | <u>34</u> | <u>11</u> | 4 | — | 531 | 28.8 | 53.2 | Comparative example |
| 31 | 110 | Performed | <u>71</u> | <u>23</u> | 3 | 3 | — | 457 | 37.0 | 78.2 | Example of present invention |
| 32 | 230 | Performed | 69 | 22 | 4 | 4 | Retained austenite | 467 | 36.2 | 77.5 | Example of present invention |
| 33 | 150 | Performed | 62 | 25 | 1 | <u>12</u> | — | 422 | 34.4 | 58.5 | Comparative example |
| 34 | 190 | Performed | 62 | 21 | <u>0</u> | <u>17</u> | — | 431 | 34.2 | 54.3 | Comparative example |
| 35 | 210 | Performed | 66 | 26 | 4 | 4 | — | 476 | 35.1 | 78.3 | Example of present invention |
| 36 | <u>7</u> | Performed | <u>71</u> | 22 | 1 | <u>6</u> | — | 428 | 33.8 | 57.0 | Comparative example |
| 37 | <u>550</u> | Performed | <u>55</u> | <u>18</u> | <u>11</u> | <u>16</u> | — | 485 | 32.2 | 48.6 | Comparative example |
| 38 | 170 | Not performed | 69 | 25 | 5 | 1 | — | 457 | 37.3 | 83.1 | Example of present invention |
| 39 | 220 | Not performed | 72 | <u>19</u> | 3 | <u>6</u> | — | 446 | 32.5 | 60.3 | Comparative example |
| 40 | 190 | Performed | 83 | <u>9</u> | <u>0</u> | <u>8</u> | — | 403 | 33.1 | 62.7 | Comparative example |
| 41 | 150 | Performed | 71 | <u>21</u> | <u>1</u> | <u>7</u> | — | 436 | 31.7 | 58.9 | Comparative example |

Underlined values are outside the scope of the present invention.

As is clear from Tables 2 and 3, in examples of the present invention, steel sheets contain a ferrite phase having an area fraction of 60% or more, a pearlite phase having an area fraction of 20% to 30%, and a bainite phase having an area fraction of 1% to 5%, the area fraction of a cementite phase present in a grain of the ferrite phase being 5% or less, and have high ductility and stretch flangeability at a tensile strength (TS) of 440 MPa to 490 MPa.

On the other hand, in comparative examples, one or more of the ductility and the stretch flangeability are low. In particular, in comparative examples in which the composition is not appropriate, it is clear that the ductility and the stretch flangeability are not improved even if the area fraction of a ferrite phase, the area fraction of a pearlite phase, the area fraction of a bainite phase, and the area fraction of a cementite phase present in a grain of the ferrite phase are appropriately adjusted.

The above results confirm that when a steel sheet having a predetermined composition contains a ferrite phase having an area fraction of 60% or more, a pearlite phase having an area fraction of 20% to 30%, and a bainite phase having an area fraction of 1% to 5%, the area fraction of a cementite phase present in a grain of the ferrite phase being 5% or less, a hot-dip galvanized steel sheet having high strength, that is, a tensile strength of 440 MPa to 490 MPa, good ductility, and good stretch flangeability can be obtained.

A hot-dip galvanized steel sheet according to the present invention has excellent strength and formability and can be used as a surface-treated steel sheet that is advantageous in lightening and strengthening automobile bodies when being used in automobile floors which are formed so as to have a complicated shape.

The invention claimed is:

1. A hot-dip galvanized steel sheet comprising a steel sheet having a composition containing 0.100% to 0.200% C, 0.50% or less Si, 0.60% or less Mn, 0.100% or less P, 0.0100% or less S, 0.010% to 0.100% Al, and 0.0100% or less N on a mass basis, the remainder comprising Fe and inevitable impurities, the steel sheet having a microstructure containing a ferrite phase having an area fraction of 60% to 79%, a pearlite phase having an area fraction of 20% to 30%, and a bainite phase having an area fraction of 1% to 5%, the area fraction of a cementite phase present in a grain of the ferrite phase being 1% or more and 5% or less, wherein the hot-dip galvanized steel sheet has an elongation of 35.6% or more, a tensile strength of 440 MPa to 490 MPa, and a stretch flangeability of 77% or more.

2. The hot-dip galvanized steel sheet according to claim 1, wherein the composition of the steel sheet further contains at least one selected from the group consisting of 0.05% to 0.80% Cr, 0.005% to 0.100% V, 0.005% to 0.500% Mo, 0.01% to 0.10% Cu, 0.01% to 0.10% Ni, and 0.0003% to 0.2000% B on a mass basis.

3. The hot-dip galvanized steel sheet according to claim 1, wherein the composition of the steel sheet further contains at least one selected from the group consisting of 0.001% to 0.005% Ca and 0.001% to 0.005% of an REM on a mass basis.

4. The hot-dip galvanized steel sheet according to claim 1, wherein the composition of the steel sheet further contains at least one selected from the group consisting of 0.05% to 0.80% Cr, 0.005% to 0.100% V, 0.005% to 0.500% Mo, 0.01% to 0.10% Cu, 0.01% to 0.10% Ni, and 0.0003% to 0.2000% B and at least one selected from the group consisting of 0.001% to 0.005% Ca and 0.001% to 0.005% of an REM on a mass basis.

5. The hot-dip galvanized steel sheet according to claim 1, being a hot-dip galvannealed steel sheet.

6. The hot-dip galvanized steel sheet according to claim 1, comprising a galvanizing layer, wherein the galvanizing layer is a hot-dip galvannealing layer.

7. The hot-dip galvanized steel sheet according to claim 6, wherein the galvannealing layer has an Fe content of 7% to 15%.

8. The hot-dip galvaniized steel sheet according to claim 1, having an elongation of 36.1% or more.

9. The hot-dip galvanized steel sheet according to claim 1, herein the content of Si is 0.01% to 0.50%.

10. The hot-dip galvanized steel sheet according to claim 1, wherein the content of Mn is 0.10% to 0.60%.

11. The hot-dip galvanized steel sheet according to claim 1, wherein the content of P is 0.003% to 0.100%.

12. A method for manufacturing the hot-dip galvanized steel sheet of claim 1, comprising:
    preparing a steel material having a composition containing 0.100% to 0.200% C, 0.50% or less Si, 0.60% or less Mn, 0.100% or less P, 0.0100% or less S, 0.010% to 0.100% Al, and 0.0100% or less N on a mass basis, the remainder comprising Fe and inevitable impurities;
    heating the steel material;
    hot-rolling the steel material at a finishing delivery temperature not lower than the $Ar_3$ temperature;
    coiling a hot-rolled sheet at a temperature of 600° C. or lower;
    pickling the hot-rolled sheet;
    cold-rolling the pickled hot-rolled sheet with a reduction of 40% to 85%;
    performing heating to a temperature of 650° C. or higher at an average heating rate of 10° C./s or more;
    performing holding at a temperature of 700° C. to $(Ac_3-5)$° C. for ten seconds or more;
    performing cooling to a temperature of 300° C. to 500° C. at an average cooling rate of 10° C./s to 200° C./s;
    performing holding at a temperature of 300° C. to 500° C. for 30 seconds to 300 seconds; and
    performing hot-dip galvanizing.

13. The hot-dip galvanized steel sheet-manufacturing method according to claim 12, further comprising performing alloying after hot-dip galvanizing.

14. The hot-dip galvanized steel sheet-manufacturing method according to claim 13, wherein alloying is performed by heating a steel sheet to a temperature of 450° C. to 600° C.

15. The hot-dip galvanized steel sheet according to claim 1, wherein the composition of the steel sheet contains 0.49% or less Mn on a mass basis.

* * * * *